United States Patent
Ohta et al.

(10) Patent No.: US 10,442,079 B2
(45) Date of Patent: Oct. 15, 2019

(54) MOUNTING STRUCTURE FOR APPARATUS FOR TAKING OUT MOLDED PRODUCT

(71) Applicant: Yushin Precision Equipment Co., Ltd., Kyoto (JP)

(72) Inventors: Ryo Ohta, Kyoto (JP); Yoshiyuki Tokuyama, Kyoto (JP); Hiroyuki Arai, Kyoto (JP); Takayo Kotani, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 44 days.

(21) Appl. No.: 15/847,412

(22) Filed: Dec. 19, 2017

(65) Prior Publication Data

US 2018/0178374 A1    Jun. 28, 2018

(30) Foreign Application Priority Data

Dec. 22, 2016  (JP) .................................. 2016-248770

(51) Int. Cl.
| | |
|---|---|
| *B29C 37/00* | (2006.01) |
| *B25J 9/00* | (2006.01) |
| *B29C 45/42* | (2006.01) |
| *B25J 9/02* | (2006.01) |

(52) U.S. Cl.
CPC ............. *B25J 9/0009* (2013.01); *B25J 9/023* (2013.01); *B29C 45/42* (2013.01); *B29C 37/0007* (2013.01); *B29C 2045/4283* (2013.01)

(58) Field of Classification Search
CPC ................ B29C 37/0007; B29C 45/42; B29C 2045/4283; B25J 9/0009
See application file for complete search history.

(56) References Cited

U.S. PATENT DOCUMENTS

| | | | |
|---|---|---|---|
| 8,678,811 B2 * | 3/2014 | Hashimoto | B29C 33/44 425/444 |
| 10,086,546 B2 * | 10/2018 | Tokuyama | B29C 45/42 |

FOREIGN PATENT DOCUMENTS

| | | |
|---|---|---|
| CN | 205929240 U | 2/2017 |
| CN | 107443358 A | 12/2017 |
| JP | 2009- 269100 | 11/2009 |
| WO | 2007/046754 A1 | 4/2007 |

OTHER PUBLICATIONS

Non-patent document: from web page at htt;://www.ype.co.jp/new model/rc cata jp.pdf, 4 pages.
UK Search Report dated Jun. 13, 2018, 3 pages.

* cited by examiner

*Primary Examiner* — James P Mackey
(74) *Attorney, Agent, or Firm* — Rankin, Hill & Clark LLP

(57) ABSTRACT

There is provided a mounting structure for an apparatus for taking out a molded product, the mounting structure being configured to reduce a burden imposed on a worker required to mount the apparatus for taking out a molded product. Upright wall portions of a pair of side plates are formed with a work window. Extended wall portions are formed with a work assist window. The work window is formed to have a size that allows a worker, who is at a location at which the worker can insert bolts into three through holes in a first through hole row, to insert bolts into three through holes in a second through hole row without changing the worker's location.

8 Claims, 9 Drawing Sheets

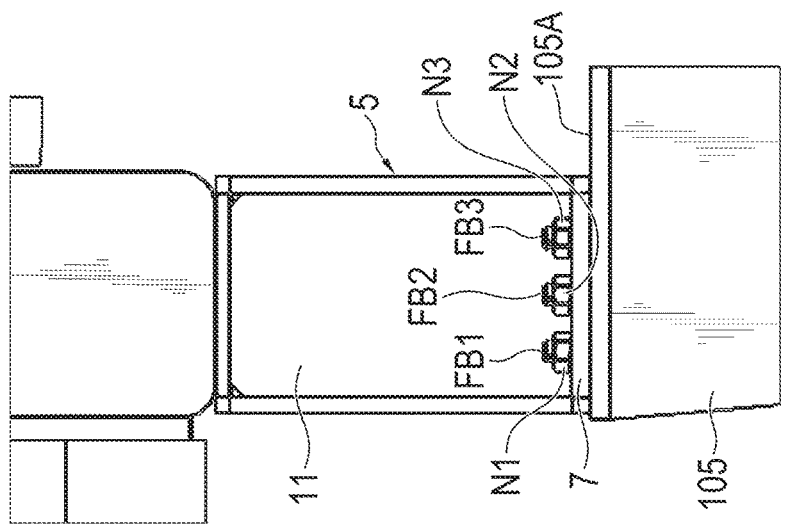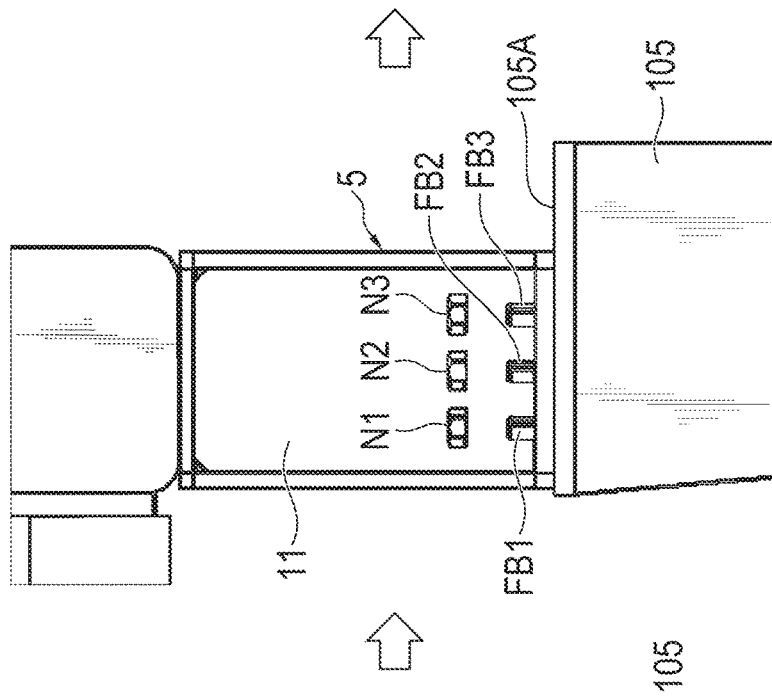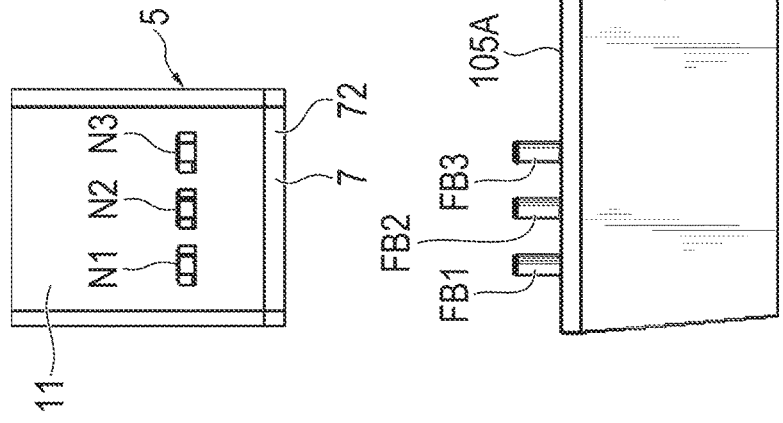

MOUNTING STRUCTURE FOR APPARATUS FOR TAKING OUT MOLDED PRODUCT

TECHNICAL FIELD

The present invention relates to a mounting structure for an apparatus for taking out a molded product that is to be mounted onto a platen of a molding machine.

BACKGROUND ART

Conventional apparatuses for taking out a molded product, which is used as fixed on a platen of a molding machine, are disclosed in FIGS. 4 and 5 of JP 2009-269100 A (Patent Document 1) and a product catalog (Non-Patent Document 1) of apparatuses for taking out a molded product manufactured and sold by the applicant under the name of Servo Traverse Robots RC etc. FIGS. 8A and 8B are each a perspective view schematically illustrating how a typical conventional apparatus 1' for taking out a molded product is mounted onto a fixed platen 103 of a molding machine 101. FIG. 9A is a sectional view of a conventional support member 5' of the apparatus for taking out a molded product as taken in the horizontal direction. FIG. 9B is a perspective view of the conventional support member. The conventional apparatus 1' includes the support member 5' which supports a lateral frame 3'. The support member 5' includes a bottom plate 7', a pair of side plates 8' and 9', a top plate 10', a first reinforcing plate 11', and a second reinforcing plate 12'. The bottom plate 7' is disposed along the upper surface of a mounting base 105. The pair of side plates 8' and 9' each have an upright wall portion 81', 91' and an extended wall portion 82', 92'. The upright wall portions 81' and 91' extend upright respectively along one pair of opposed sides of the bottom plate 7'. The extended wall portions 82' and 92' extend in the lateral direction from the upright wall portions 81' and 91', respectively. The top plate 10' faces the bottom plate 7', and is connected to the pair of side plates 8' and 9'. The first reinforcing plate 11' and the second reinforcing plate 12' are disposed with a predetermined spacing therebetween in the direction of arrangement of another pair of opposed sides of the bottom plate 7' that are different from the one pair of opposed sides, and connected to at least the bottom plate 7' and the top plate 10'. The bottom plate 7' is provided with flange portions 71' and 72' on the outer side of the second reinforcing plate 12' and the first reinforcing plate 11', respectively. A first through hole row 61' of a plurality of through holes H and a second through hole row 62' of a plurality of through holes H are formed in the flange portions 71' and 72' along the second reinforcing plate 12' and the first reinforcing plate 11', respectively. The support member 5' is fixedly mounted onto the mounting base 105 by inserting a plurality of bolts into the plurality of through holes H and a plurality of threaded holes (not illustrated) formed in the mounting base 105 to be opened in the upper surface with the plurality of through holes H in each of the through hole rows 61' and 62' being aligned with the plurality of threaded holes, and by screwing threaded portions of the plurality of bolts into the threaded holes.

Patent Document

[Patent Document 1] JP 2009-269100 A

Non-Patent Document

[Non-Patent Document 1] http://www.ype.co.jp/new_model/rc_cata_jp.pdf

SUMMARY OF INVENTION

Technical Problem

To insert bolts into the plurality of through holes H in the through hole row 61' formed in one flange portion 71' and tighten the bolts, a worker OP places a stepladder 107 on one side of the molding machine 101 as illustrated in FIG. 8A, and climbs up the stepladder 107 to perform the bolt tightening work. To insert bolts into the plurality of through holes H in the through hole row 62' formed in the other flange portion 72' and tighten the bolts, the worker OP places the stepladder 107 on the other side of the molding machine 101 as illustrated in FIG. 8B, and climbs up the stepladder 107 to perform the bolt tightening work. Preferably, the bolts are tightened by the following steps: inserting bolts into some of the through holes H in the one flange portion 71' and tightening those bolts; thereafter inserting bolts into some of the through holes H in the other flange portion 72' and tightening those bolts; then inserting bolts into the remaining through holes H in the one flange portion 71' and tightening those bolts; and thereafter inserting bolts into the remaining through holes H in the other flange portion 72' and tightening those bolts. To implement the preferable bolt tightening steps, the worker OP must move the stepladder 107 and climbs up and down the stepladder 107 over and over again. Thus conventionally, a very heavy work burden has been imposed on the worker.

Further, conventionally, to change the position of the lateral frame which is bolted to the top plate 10' of the support member 5', the leading end of a wrench, with a bolt attached thereto, is inserted into a plurality of through holes 14' formed in a lower plate 13' configured to face the top plate 10' of the support member 5' to perform the bolt tightening work. This work also has imposed a heavy burden on the worker.

Accordingly, an object of the present invention is to provide a mounting structure for an apparatus for taking out a molded product, the mounting structure being configured to reduce a burden imposed on a worker required to mount the apparatus for taking out a molded product.

In addition to the above object, another object of the present invention is to provide a mounting structure for an apparatus for taking out a molded product, the mounting structure being configured to reduce a burden imposed on a worker required to change the mounting position of a lateral frame.

Solution to Problem

The present invention is directed to a mounting structure configured to fixedly mount an apparatus for taking out a molded product onto an upper surface of a fixed platen of a molding machine or a mounting base fixedly attached onto the fixed platen. The apparatus for taking out a molded product that the present invention is directed to includes a support member for a lateral frame. The support member includes a bottom plate, a pair of side plates, a top plate, a first reinforcing plate, and a second reinforcing plate. The bottom plate is disposed along an upper surface of the fixed platen of the molding machine or an upper surface of the mounting base. The pair of side plates each have an upright wall portion and an extended wall portion. The upright wall portions extend upright respectively along one pair of opposed sides of the bottom plate. The extended wall portions extend in a lateral direction from the upright wall portions. The top plate faces the bottom plate, and is connected to the pair of side plates. The lateral frame is supported on the top plate by the support member. The first reinforcing plate and the second reinforcing plate are disposed with a predetermined spacing therebetween in a direction of arrangement of another pair of opposed sides of the bottom plate that are different from the one pair of opposed sides, and connected to at least the bottom plate and the top plate. A first through hole row of a plurality of through holes and a second through hole row of a plurality of through holes are formed in the bottom plate respectively along the first and second reinforcing plates. The mounting structure is configured such that the apparatus is fixedly mounted onto the fixed platen or the mounting base by inserting a plurality of bolts into the plurality of through holes in each of the first and second through hole rows and a plurality of threaded holes formed in the fixed platen or the mounting base to be opened in the upper surface with the plurality of through holes in each of the first and second through hole rows being aligned with the plurality of threaded holes, and by screwing threaded portions of the plurality of bolts into the threaded holes. In the present invention, the bottom plate includes a flange portion located in a direction opposite to a direction in which the extended wall portions of the pair of side plates extend, and formed to extend in the opposite direction further from the first reinforcing plate. The first through hole row is formed in the flange portion. The second through hole row is formed in a portion of the bottom plate along the second reinforcing plate. The upright wall portion of at least one of the pair of side plates is formed with a work window configured to allow a worker, who is at a location at which the worker can insert the plurality of bolts into the plurality of through holes in the first through hole row, to insert the plurality of bolts into the plurality of through holes in the second through hole row without changing the worker's location.

According to the present invention, a worker can insert a plurality of bolts and tighten the plurality of bolts through a work window, and thus a burden imposed on the worker can be significantly reduced compared to the related art.

Also when the support member of the apparatus for taking out a molded product is fixedly mounted onto the fixed platen or the mounting base by screwing a plurality of nuts with a plurality of threaded portions of a plurality of mounting bolts provided at the fixed platen or the mounting base so as to extend beyond the upper surface with the plurality of mounting bolts being fitted in the plurality of through holes, the worker can screw the plurality of nuts with the plurality of mounting bolts which penetrate the plurality of through holes in the second through hole row through the work window without changing the worker's location.

The mounting structure may further include a blocking member configured to block the work window after the worker completes fixing work. Providing such a blocking member can prevent accumulation of dust inside the support member through the work window.

The extended wall portion of at least one of the pair of side plates may be formed with a work assist window when the lateral frame is fixed to the top plate by screwing a plurality of bolts into a plurality of threaded holes formed in a bottom portion of the lateral frame through a plurality of top-plate through holes formed in the top plate, a lower plate configured to face the top plate with a spacing therebetween is fixed to the pair of extended wall portions of the pair of side plates, and the lower plate is formed with a plurality of lower-plate through holes so as to face the plurality of top-plate through holes formed in the top plate. The work assist window is configured to allow the worker to insert one or both of the worker's hands thereinto in order to assist work of inserting the plurality of bolts into the plurality of top-plate through holes formed in the top plate. Providing such a work assist window significantly reduces a burden imposed on the worker during the work of tightening the bolts using a wrench through the lower-plate through holes.

Preferably, a decorative plate configured to block both the work window and the work assist window is removably fixed onto the side plate in which the work window and the work assist window are provided. Thus, with a single decorative plate, both the work window and the work assist window can be blocked, thereby reducing the number of parts.

BRIEF DESCRIPTION OF DRAWINGS

FIGS. 7A to 7C are each a working process view illustrating the mounting structure according to the second embodiment.

DESCRIPTION OF EMBODIMENTS

A mounting structure for an apparatus for taking out a molded product according to embodiments of the present invention will be described in detail below with reference to the accompanying drawings.

<Configuration of Apparatus for Taking Out Molded Product>

Figure 1A:
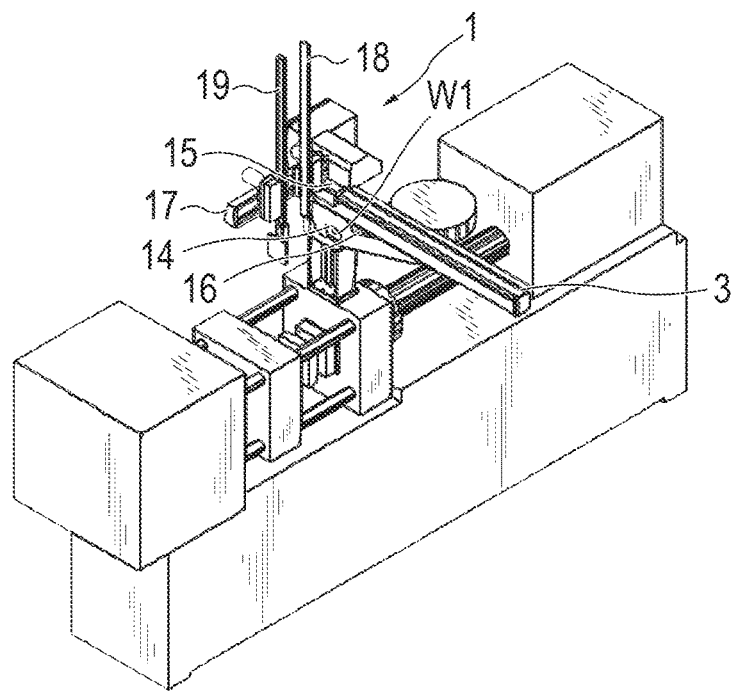
FIGS. 1A and 1B are each a perspective view illustrating the overall configuration of a molding system in which an apparatus for taking out a molded product is mounted onto a mounting base attached onto a platen of a molding machine by a mounting structure according to a first embodiment of the present invention.
Figure 1B:
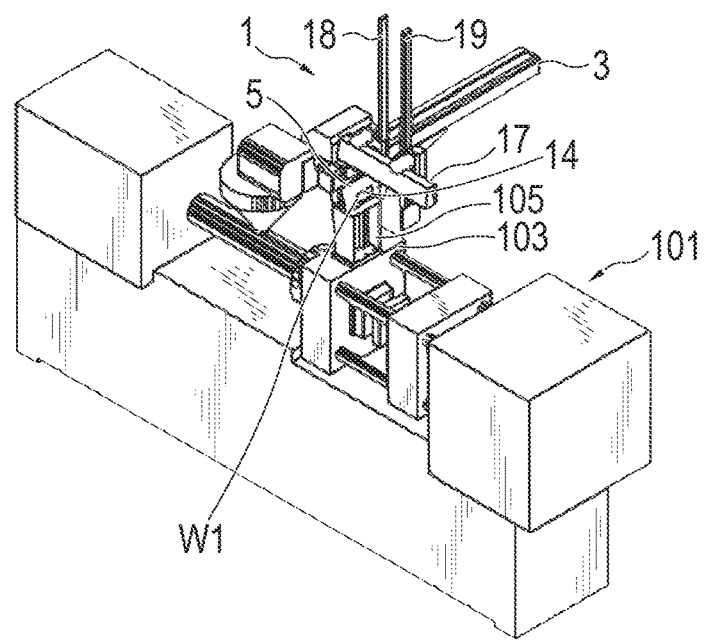

FIGS. 1A and 1B are each a perspective view illustrating the overall configuration of a molding system in which an apparatus 1 for taking out a molded product is mounted onto a mounting base 105 attached onto a platen 103 of a molding machine 101 by a mounting structure according to a first embodiment of the present invention. The apparatus 1 is a traverse-type apparatus for taking out a molded product. A support member 5 is mounted onto the mounting base 105 attached onto the fixed platen 103 of the molding machine 101. The apparatus 1 illustrated in FIG. 1 includes a lateral frame 3, a first transfer body 15, a pull-out frame 17, a runner elevating unit 18, and a molded product-suctioning elevating unit 19. The lateral frame 3 has a cantilever beam structure in which the lateral frame 3 extends in the X direction which is horizontal and orthogonal to the longitudinal direction of the molding machine, not illustrated. The first transfer body 15 is supported by the lateral frame 3, and advanced and retracted in the X direction along the lateral frame 3 by a drive source that is an AC servomotor included in a servomechanism. The pull-out frame 17 is provided to the first transfer body 15, and extends in the Y direction which is parallel to the longitudinal direction of the molding machine. The runner elevating unit 18 and the molded product-suctioning elevating unit 19 are supported by the pull-out frame 17 to be movable in the Y direction by a drive source formed by an AC servomotor included in the servomechanism.

Mounting Structure of First Embodiment

Figure 2:
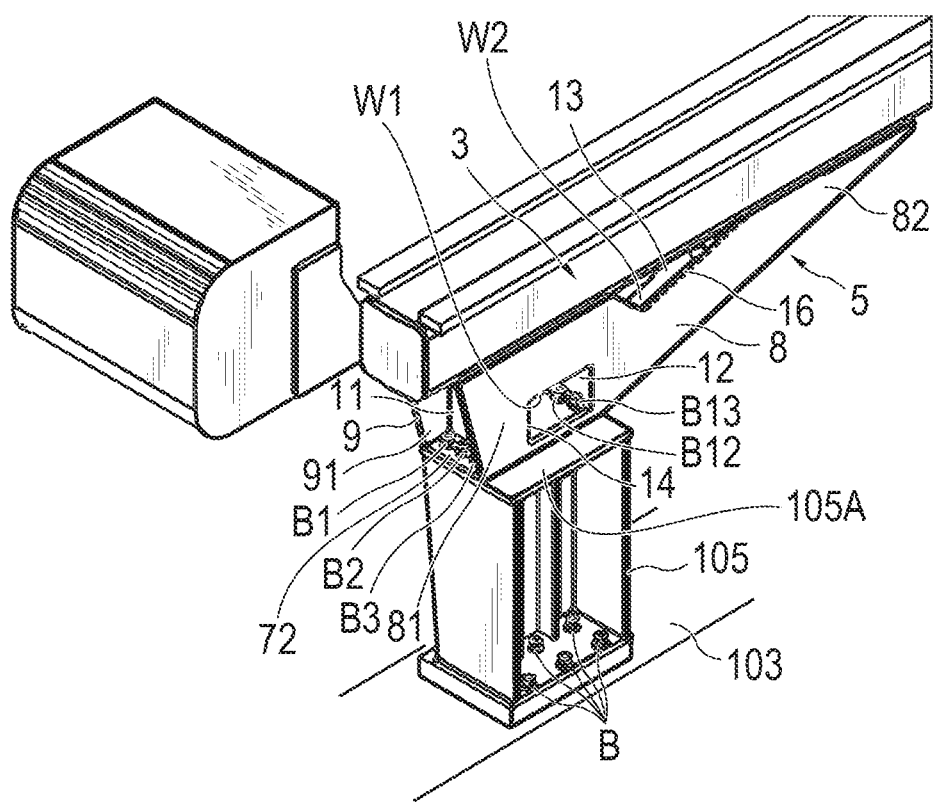
FIG. 2 is a perspective view illustrating an essential portion of the mounting structure in the molding system illustrated in FIGS. 1A and 1B.
Figure 3A:
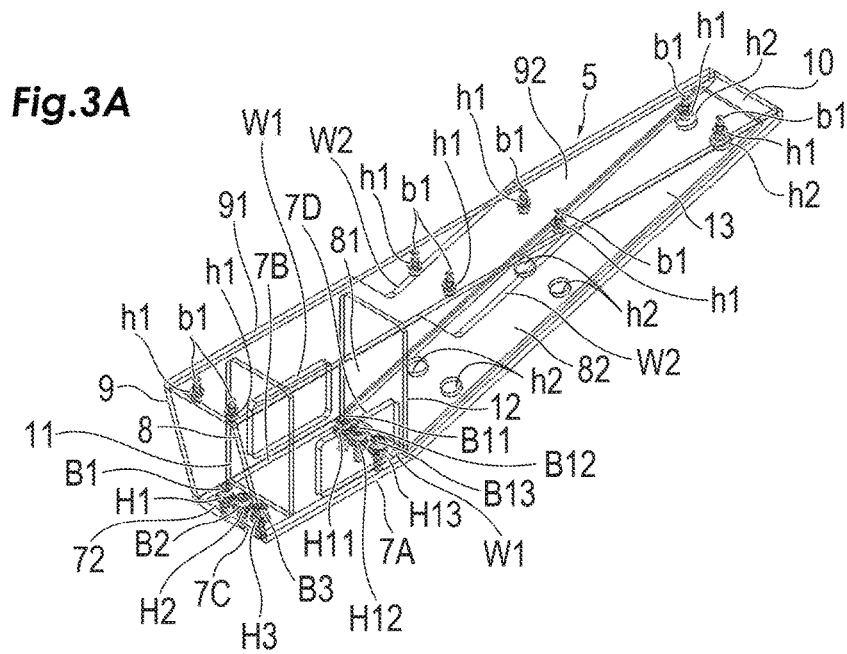
FIG. 3A is a skeleton view of a support member of the mounting structure.

Amounting structure of a first embodiment for the apparatus will be described below. FIG. 2 is a perspective view illustrating an essential portion of a mounting structure of the first embodiment in the molding system illustrated in FIGS. 1A and 1B. FIG. 3A is a skeleton view of the support member 5 of the mounting structure. The support member 5 includes a bottom plate 7, a pair of side plates 8 and 9, a top plate 10, a first reinforcing plate 11, a second reinforcing plate 12, and a lower plate 13. The bottom plate 7 is disposed along an upper surface of the mounting base 105 fixedly attached onto the fixed platen 103 using bolts B. The pair of side plates 8 and 9 each have an upright wall portion 81, 91 and an extended wall portion 82, 92. The upright wall portions 81 and 91 extend upright respectively along one pair of opposed sides 7A and 7B of the bottom plate 7. The extended wall portions 82 and 92 extend in the lateral direction from the upright wall portions 81 and 91, respectively. The top plate 10 faces the bottom plate 7, and is connected to the pair of side plates 8 and 9. The first reinforcing plate 11 and the second reinforcing plate 12 are disposed with a predetermined spacing therebetween in the direction of arrangement of another pair of opposed sides 7C and 7D of the bottom plate 7 that are different from the one pair of opposed sides 7A and 7B, and connected to at least the bottom plate 7 and the top plate 10. In the embodiment, the first reinforcing plate 11 and the second reinforcing plate 12 are also connected to the pair of upright wall portions 81 and 91.

Figure 3B:
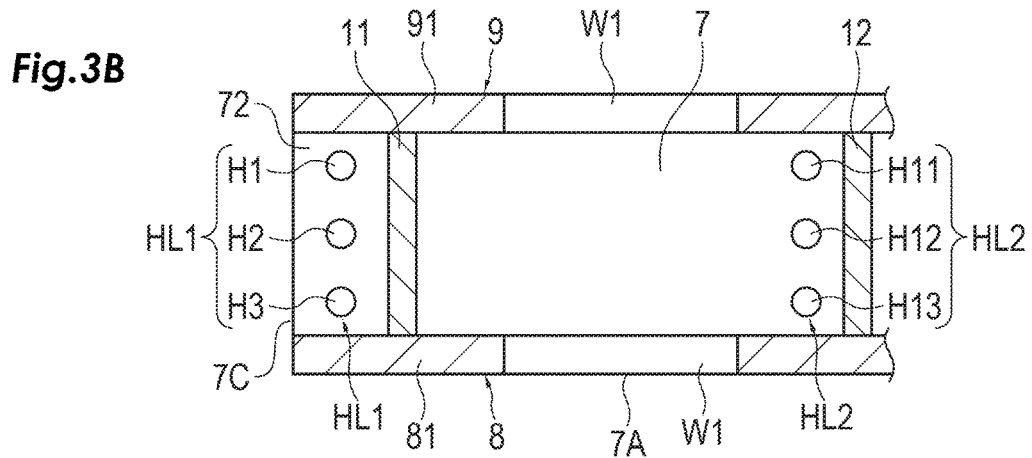
FIG. 3B is a sectional view of the support member of the apparatus for taking out a molded product as taken in the horizontal direction.
Figure 3C:
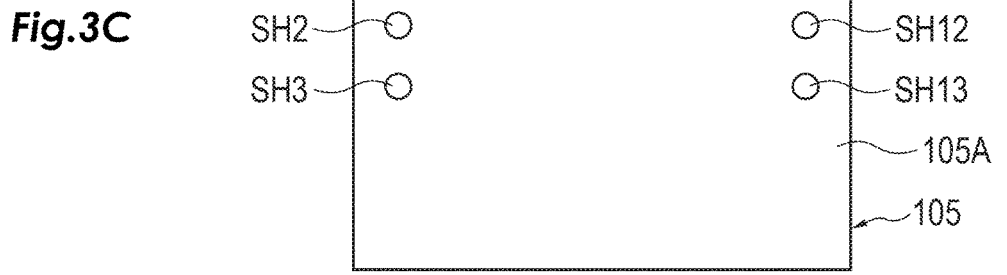
FIG. 3C is a plan view of the upper surface of the mounting base.

As illustrated in FIG. 3B, the bottom plate 7 includes a flange portion 72 located in a direction opposite to a direction in which the extended wall portions 82 and 92 of the pair of side plates 8 and 9 extend, and formed to extend in the opposite direction further from the first reinforcing plate 11. A first through hole row HL1 of three through holes H1 to H3 is formed in the flange portion 72. A second through hole row HL2 of three through holes H11 to H13 is formed in a portion of the bottom plate 7 along the second reinforcing plate 12. The support member 5 is fixedly mounted onto the mounting base 105 by inserting bolts B1 to B3 and B11 to B13 into the through holes H1 to H3 and H11 to H13 and a plurality of threaded holes SH1 to SH13 [FIG. 3C] formed in the mounting base 105 to be opened in an upper surface 105A with the through holes H1 to H3 and H11 to H13 being aligned with the plurality of threaded holes SH1 to SH13 [FIG. 3C], and by screwing threaded portions B1 a to B3 a and B11 to B13 of the bolts into the threaded holes SH1 to SH13.

The lateral frame 3 is fixed to the top plate 10 by screwing a plurality of bolts b1 into a plurality of threaded holes (not illustrated) formed in a bottom portion of the lateral frame 3 through a plurality of top-plate through holes h1 formed in the top plate 10. The lower plate 13, which is configured to face the top plate 10 with a spacing therebetween, is fixed to the pair of extended wall portions 82 and 92 of the pair of side plates 8 and 9. The lower plate 13 is formed with a plurality of lower-plate through holes h2 so as to face the plurality of top-plate through holes h1 formed in the top plate. A worker attaches the lateral frame 3 to the top plate by inserting a wrench through the lower-plate through holes h2 and tightening the bolts b1.

Figure 4:
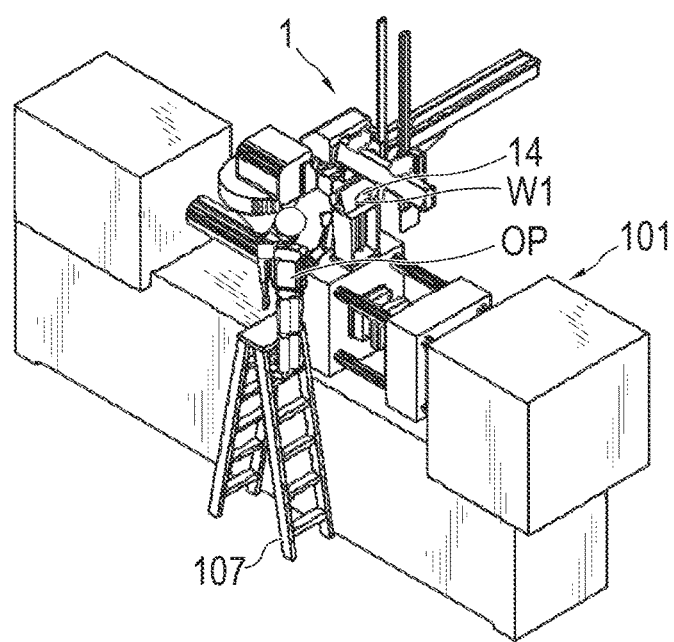
FIG. 4 illustrates that the molding system is in operation.

In the embodiment, the upright wall portions 81 and 91 of the pair of side plates 8 and 9 are each formed with a work window W1, and the extended wall portions 82 and 92 are each formed with a work assist window W2. The work window W1 has a substantially rectangular profile, and the work assist window W2 has a triangular profile. As illustrated in FIG. 4, the work window W1 is formed to have a size that allows a worker, who is at a location at which the worker can insert the bolts B1 to B3 into the three through holes H1 to H3 in the first through hole row, to insert the bolts B11 to B13 into the three through holes H11 to H13 in the second through hole row without changing the worker's location. When the work window W1 is provided, the worker can insert and tighten the bolts B11 to B13 through the work window W1, and thus can finish the mounting work without climbing down a stepladder 107.

Figure 5A:
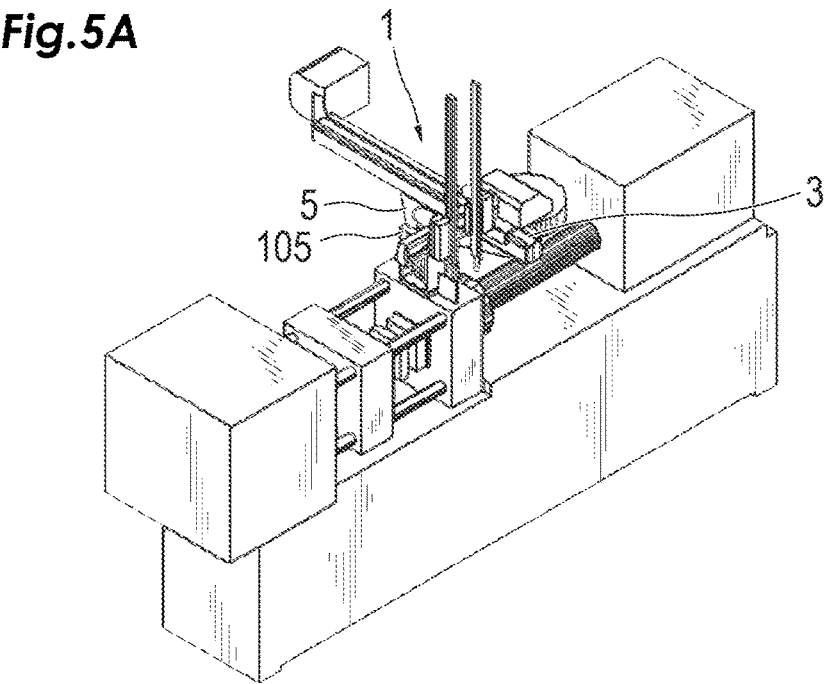
FIGS. 5A and 5B illustrate how to change the mounting position of a lateral frame.
Figure 5B:
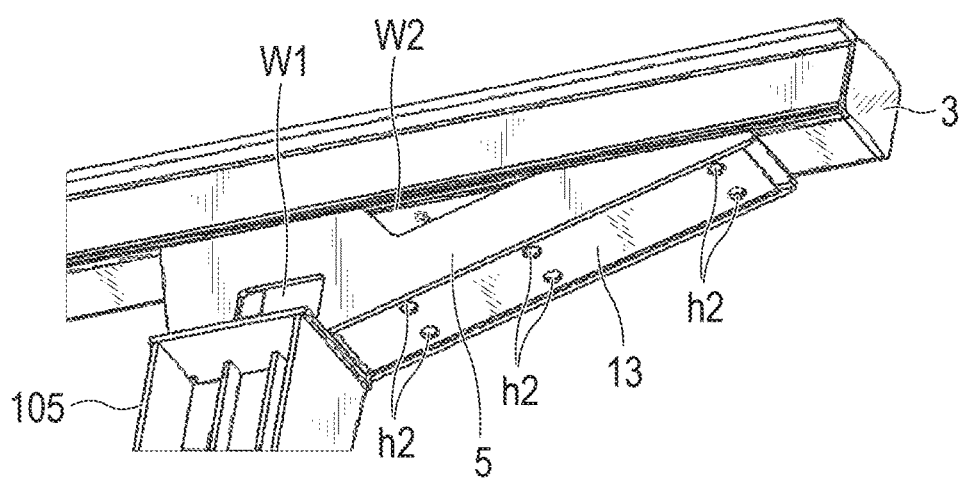
Figure 6A:
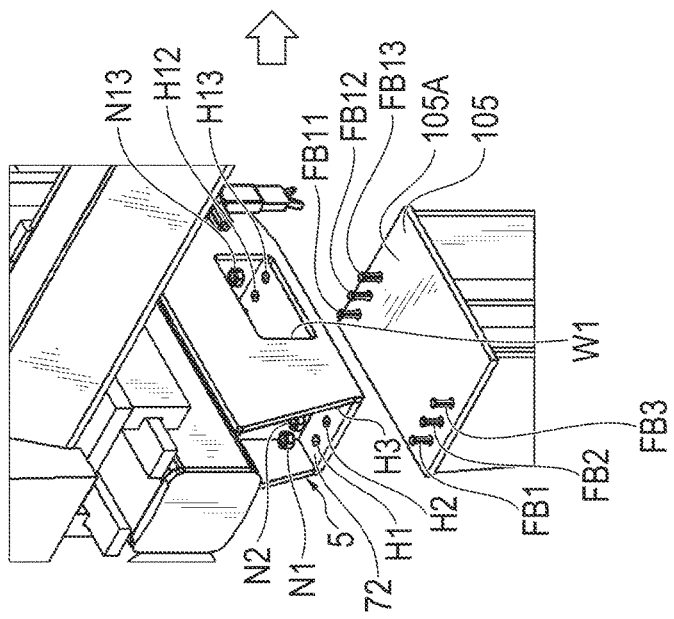
FIGS. 6A to 6C are each a working process view illustrating a mounting structure according to a second embodiment of the present invention.
Figure 6B:
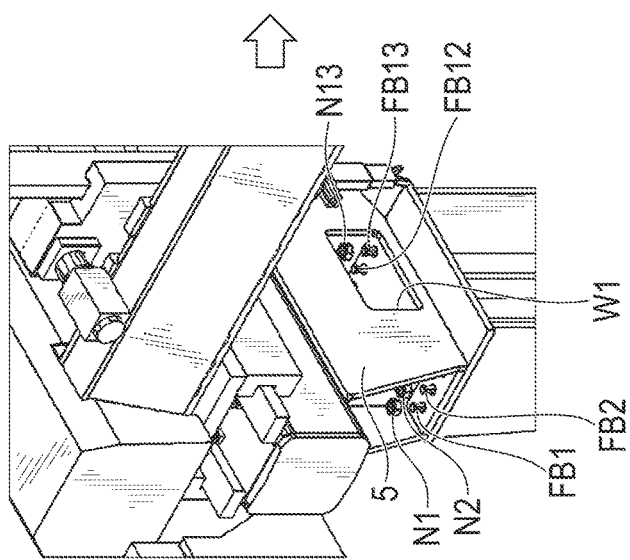
Figure 6C:
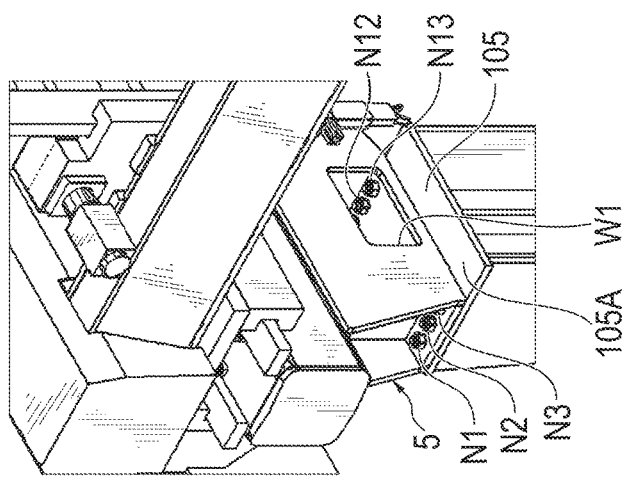
Figure 8A:
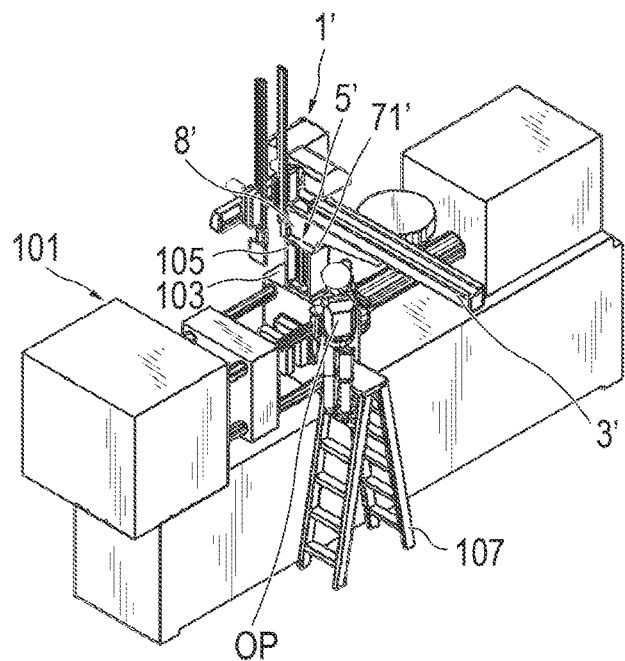
FIGS. 8A and 8B are each a perspective view schematically illustrating how a typical conventional apparatus for taking out a molded product is mounted onto a fixed platen of a molding machine.
Figure 8B:
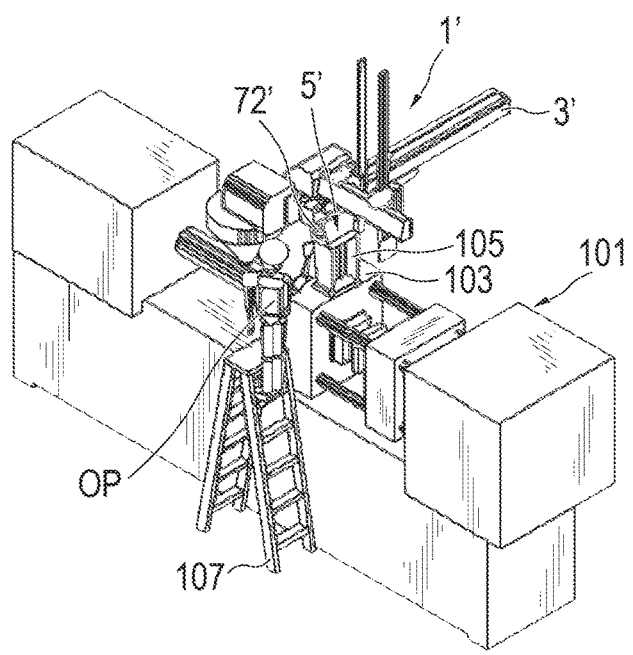
Figure 9A:
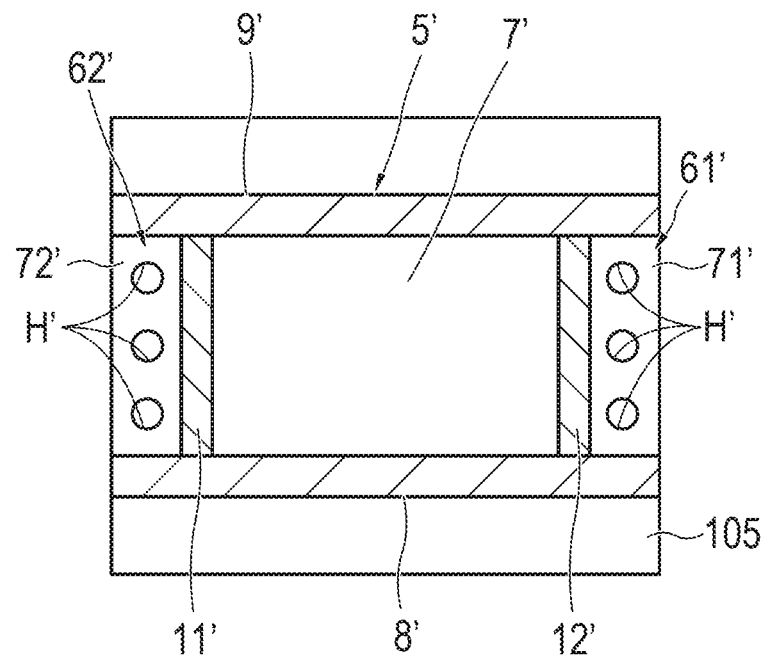
FIG. 9A is a sectional view of a conventional support member of the apparatus for taking out a molded product, as taken in the horizontal direction.
Figure 9B:
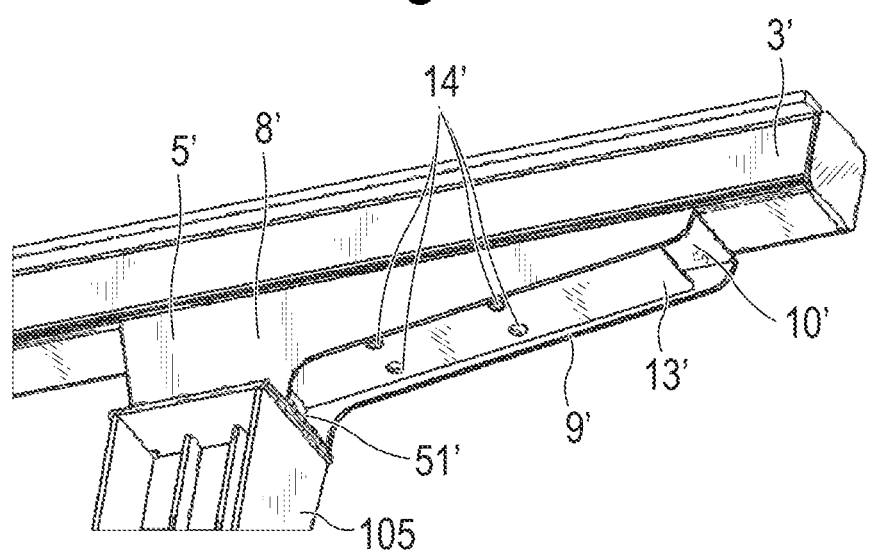
FIG. 9B is a perspective view of the support member.

The work assist window W2 is utilized to tighten the bolts b1 in an area in which the distance between the top plate 10 and the lower plate 13 is long. That is, the worker temporarily tightens the bolts b1 in the area in which the distance between the top plate 10 and the lower plate 13 is long by inserting one or both of the worker's hands through the work assist window W2, and thereafter tightens the bolts b1 by inserting a wrench through the lower-plate through holes h2, thereby significantly improving the workability for the worker to tighten the bolts. When the bolts are not temporarily tightened, the worker can tighten the bolts b1 while looking into the support member 5 through the work assist window W2, thereby significantly facilitating the work of tightening the bolts compared to the related art. Even after the apparatus 1 is mounted onto the molding machine 101, the mounting position of the lateral frame 3 is occasionally changed such that the lateral frame 3 does not interfere with a structure in the surroundings because of a factory layout change, etc. FIGS. 5A and 5B illustrate a state in which the mounting position of the lateral frame 3 has been changed. The work of changing the mounting position is performed with the stepladder placed under the support member 5.

Mounting Structure of Second Embodiment

FIGS. 6A to 6C and 7A to 7C are each a working process view illustrating a mounting structure of a second embodiment of the present invention. In the mounting structure of the second embodiment, unlike the mounting structure of the first embodiment illustrated in FIGS. 1 to 5, the support member 5 is fixedly mounted onto the mounting base 105 by screwing six nuts N1 to N13 with threaded portions of six mounting bolts FB1 to FB13 provided at the mounting base 105 so as to extend beyond the upper surface 105A with the mounting bolts FB1 to FB13 being fitted in the through holes H1 to H13 formed in the bottom plate 7 of the support member 5. Also in this case, a worker can screw the nuts N11 to N13 with the three mounting bolts FB11 to FB13 which penetrate the three through holes H11 to H13 in the second through hole row through the work window W1 without changing the worker's location.

<Modifications>

In the embodiments described above, the support member 5 of the apparatus for taking out a molded product is mounted to the mounting base 105 attached onto the fixed platen 103. As a matter of course, however, the mounting structure of the first embodiment and the mounting structure of the second embodiment described above can also be applied when the support member 5 of the apparatus for taking out a molded product is directly mounted to the fixed platen 103.

In the embodiments described above, the work window W1 and the work assist window W2 are provided in the support member 5 together. However, it is not necessary to always provide the work window W1 and the work assist window W2 together. In the embodiments described above, a pair of work windows W1 and a pair of work assist windows S2 are provided in the support member 5. However, it is not necessary to always provide such windows in pairs, and such windows may be provided singly.

The mounting structure may further include a blocking member configured to block the work window W1 after the worker completes fixing work. Providing the blocking member can prevent accumulation of dust inside the support member through the work window W1. A decorative plate configured to block both the work window W1 and the work assist window W2 may be removably fixed onto the side-plate in which the work window W1 and the work assist window W2 are provided. Thus, with a single decorative plate, both the work window and the work assist window can be blocked, thereby reducing the number of parts.

INDUSTRIAL APPLICABILITY

According to the present invention, a worker can insert a plurality of bolts and tighten the plurality of bolts through a work window, and thus a burden imposed on the worker can be significantly reduced compared to the related art.

What is claimed is:

1. A mounting structure for an apparatus for taking out a molded product, configured to fixedly mount the apparatus onto a fixed platen of a molding machine or a mounting base fixedly attached onto the fixed platen, the apparatus for taking out a molded product from the molding machine, including a support member for a lateral frame, the support member including:
   a bottom plate disposed along an upper surface of the fixed platen of the molding machine or an upper surface of the mounting base;
   a pair of side plates each having an upright wall portion and an extended wall portion wherein the upright wall portions extend upright respectively along one pair of opposed sides of the bottom plate and the extended wall portions extend in a lateral direction from the upright wall portions;
   a top plate facing the bottom plate and connected to the pair of side plates wherein the lateral frame is supported on the top plate by the support member; and
   a first reinforcing plate and a second reinforcing plate disposed with a predetermined spacing therebetween in a direction of arrangement of another pair of opposed sides of the bottom plate that are different from the one pair of opposed sides, and connected to at least the bottom plate and the top plate, wherein a first through hole row of a plurality of through holes and a second through hole row of a plurality of through holes are formed in the bottom plate respectively along the first and second reinforcing plates, the mounting structure for an apparatus for taking out a molded product being configured such that the apparatus for taking out a molded product is fixedly mounted onto the fixed platen of the molding machine or the mounting base fixedly attached to the fixed platen by inserting a plurality of bolts into the plurality of through holes in each of the first and second through hole rows and a plurality of threaded holes formed in the fixed platen or the mounting base to be opened in the upper surface with the plurality of through holes in each of the first and second through hole rows being aligned with the plurality of threaded holes, and by screwing threaded portions of the plurality of bolts into the threaded holes, wherein:

the bottom plate includes a flange portion located in a direction opposite to a direction in which the extended wall portions of the pair of side plates extend, and formed to extend in the opposite direction further from the first reinforcing plate;

the first through hole row is formed in the flange portion, and the second through hole row is formed in a portion of the bottom plate along the second reinforcing plate; and the upright wall portion of at least one of the pair of side plates is formed with a work window configured to allow a worker, who is at a location at which the worker can insert the plurality of bolts into the plurality of through holes in the first through hole row, to insert the plurality of bolts into the plurality of through holes in the second through hole row without changing the worker's location.

2. A mounting structure for an apparatus for taking out a molded product, configured to fixedly mount the apparatus onto a fixed platen of a molding machine or a mounting base fixedly attached onto the fixed platen, the apparatus for taking out a molded product from the molding machine, including a support member for a lateral frame, the support member including:
   a bottom plate disposed along an upper surface of the fixed platen of the molding machine or an upper surface of the mounting base;
   a pair of side plates each having an upright wall portion and an extended wall portion wherein the upright wall portions extend upright respectively along one pair of opposed sides of the bottom plate and the extended wall portions extend in a lateral direction from the upright wall portions;
   a top plate facing the bottom plate and connected to the pair of side plates wherein the lateral frame is supported on the top plate by the support member; and
   a first reinforcing plate and a second reinforcing plate disposed with a predetermined spacing therebetween in a direction of arrangement of another pair of opposed sides of the bottom plate that are different from the one pair of opposed sides, and connected to at least the bottom plate and the top plate, wherein a first through hole row of a plurality of through holes and a second through hole row of a plurality of through holes are formed in the bottom plate respectively along the first and second reinforcing plates, the mounting structure for an apparatus for taking out a molded product being configured such that the apparatus for taking out a molded product is fixedly mounted onto the fixed platen of the molding machine or the mounting base fixedly attached to the fixed platen by screwing a plurality of nuts with a plurality of threaded portions of a plurality of mounting bolts provided at the fixed platen or the mounting base so as to extend beyond the upper surface with the plurality of mounting bolts being fitted in the plurality of through holes, wherein:

the bottom plate includes a flange portion located in a direction opposite to a direction in which the extended wall portions of the pair of side plates extend, and formed to extend in the opposite direction further from the first reinforcing plate;

the first through hole row is formed in the flange portion, and the second through hole row is formed in a portion of the bottom plate along the second reinforcing plate; and the upright wall portion of at least one of the pair of side plates is formed with a work window configured to allow a worker, who is at a location at which the worker can screw the plurality of nuts with the plurality of mounting bolts which penetrate the plurality of through holes in the first through hole row, to screw the plurality of nuts with the plurality of mounting bolts which penetrate the plurality of through holes in the second through hole row without changing the worker's location.

3. The mounting structure for an apparatus for taking out a molded product according to claim 1, further comprising:
a blocking member configured to block the work window after the worker completes fixing work.

4. The mounting structure for an apparatus for taking out a molded product according to claim 1, wherein:
the lateral frame is fixed to the top plate by screwing a plurality of bolts into a plurality of threaded holes formed in a bottom portion of the lateral frame through a plurality of top-plate through holes formed in the top plate;
a lower plate configured to face the top plate with a spacing therebetween is fixed to the pair of extended wall portions of the pair of side plates;
the lower plate is formed with a plurality of lower-plate through holes so as to face the plurality of top-plate through holes formed in the top plate; and
the extended wall portion of at least one of the pair of side plates is formed with a work assist window configured to allow the worker to insert one or both of the worker's hands thereinto in order to assist work of inserting the plurality of bolts into the plurality of top-plate through holes formed in the top plate.

5. The mounting structure for an apparatus for taking out a molded product according to claim 4, wherein
a decorative plate configured to block both the work window and the work assist window is removably fixed onto the side plate in which the work window and the work assist window are provided.

6. The mounting structure for an apparatus for taking out a molded product according to claim 2, further comprising:
a blocking member configured to block the work window after the worker completes fixing work.

7. The mounting structure for an apparatus for taking out a molded product according to claim 2, wherein:
the lateral frame is fixed to the top plate by screwing a plurality of bolts into a plurality of threaded holes formed in a bottom portion of the lateral frame through a plurality of top-plate through holes formed in the top plate;
a lower plate configured to face the top plate with a spacing therebetween is fixed to the pair of extended wall portions of the pair of side plates;
the lower plate is formed with a plurality of lower-plate through holes so as to face the plurality of top-plate through holes formed in the top plate; and
the extended wall portion of at least one of the pair of side plates is formed with a work assist window configured to allow the worker to insert one or both of the worker's hands thereinto in order to assist work of inserting the plurality of bolts into the plurality of top-plate through holes formed in the top plate.

8. The mounting structure for an apparatus for taking out a molded product according to claim 7, wherein
a decorative plate configured to block both the work window and the work assist window is removably fixed onto the side plate in which the work window and the work assist window are provided.

* * * * *